United States Patent [19]
Campbell et al.
[11] Patent Number: 4,870,433
[45] Date of Patent: Sep. 26, 1989

[54] THERMAL DROP-ON-DEMAND INK JET PRINT HEAD

[75] Inventors: Alan S. Campbell, Lexington, Ky.; Jerome M. Eldridge, Los Gatos, Calif.; Francis C. Lee; Graham Olive, both of San Jose, Calif.

[73] Assignee: International Business Machines Corporation, Armonk, N.Y.

[21] Appl. No.: 225,321

[22] Filed: Jul. 28, 1988

[51] Int. Cl.⁴ .......................... G01D 15/16; B41J 3/04
[52] U.S. Cl. .......................... 346/140 R
[58] Field of Search .......................... 346/140

[56] References Cited

U.S. PATENT DOCUMENTS

| | | | |
|---|---|---|---|
| 4,317,124 | 2/1982 | Shirato et al. | 346/140 |
| 4,337,467 | 6/1982 | Yano | 346/140 X |
| 4,339,762 | 7/1982 | Shirato | 346/140 |
| 4,345,262 | 8/1982 | Shirato | 346/140 |
| 4,514,741 | 4/1985 | Meyer | 346/140 |
| 4,590,489 | 5/1986 | Tsumura | 346/76 PH |
| 4,792,818 | 12/1988 | Eldridge | 346/140 |

FOREIGN PATENT DOCUMENTS

| | | |
|---|---|---|
| 0124312 | 4/1984 | European Pat. Off. . |
| 138460 | 8/1984 | Japan . |
| 208246 | 9/1985 | Japan . |

*Primary Examiner*—Joseph W. Hartary
*Attorney, Agent, or Firm*—Otto Schmid, Jr.

[57] ABSTRACT

An array of resistive heater elements, each of which is connected in an electrical circuit between a common electrode and one of the control electrodes. Each of the resistive heater elements comprises a plurality of portions arranged so that a small elongated opening in provided at the middle of the heater element where no resistive material is present. Each of the resistive heater elements, when energized, has a bubble formed at each of the plurality of portions. All of the bubbles coalesce to form a single pillow-shaped bubble which causes a drop of ink to be ejected from the associated nozzle. During collapse of the bubble, the bubble collapses inwardly so that cavitational shock impacts the heater element at the opening and little or no damage to the resistive heater is produced.

8 Claims, 2 Drawing Sheets

THERMAL DROP-ON-DEMAND INK JET PRINT HEAD

BACKGROUND OF THE INVENTION

1. Field of the Invention

This invention relates to an ink jet printing system and more particularly to a thermal drop-on-demand ink jet printing system.

2. Description of the Prior Art

A thermal drop-on-demand ink jet printing system is known in which a heater is selectively energized to form a "bubble" in the adjacent ink. The rapid growth of the bubble causes an ink drop to be ejected from a nearby nozzle. Printing is accomplished by energizing the heater each time a drop is required at that nozzle position to produce the desired printed image.

One of the most significant failure mechanisms in a thermal drop-on-demand ink jet printing system is the erosion caused by bubble collapse after the drive pulse, which energizes the heater, is turned off. During this phase, the condensation of vapor usually produces a very high speed implosion which sends fairly high intensity shock waves to the heater surface. These waves are termed cavitational shock. Even though a passivation layer protects the top surface of the heater, in time the cavitational shock erodes the protective layer which leads to damage to the heater element and eventual failure.

One way in which the problem of cavitation shock damage has been addressed is described in U.S. Pat. No. 4,514,741 to Meyer. Meyer shows a thermal bubble jet printer in which the heater element comprises a resistive region having a conductive region at its center. The conductive region effectively electrically shorts the underlying area of the heater element and enables the production of a toroidally shaped bubble. The toroidally shaped bubble is described as fragmenting during collapse, thereby randomly distributing the resultant acoustic shock across the surface of the heater element to minimize cavitation damage. While the design may reduce cavitation damage, it is less efficient since there is no bubble in the direction of the associated nozzle whereas this direction is where the maximum pressure wave is desired.

U.S. Pat. No. 4,317,124 to Shirato et al shows a drop-on-demand ink jet printing system which utilizes a pressurized system to produce leakage of ink from the nozzles, and an ink intake, in the vicinity of the nozzle, to remove the ink not used for printing. A transducer is energized with the information signals to eject a drop of ink from the nozzle when needed for printing. One embodiment is shown in FIG. 28 which was used to gain experimental data on the optimum width of the heaters for a thermal transducer. Two spaced heaters are shown and these heaters are connected in a series electrical circuit.

European Patent Application No. 84302524.8 shows a thermal bubble jet printer in which two elongated resistive elements are spaced apart and connected in a series electrical circuit to produce a bubble for forming a drop for printing. The shape of the resulting bubble is not described, but in FIG. 5 the bubble is shown collapsing in the area between the two resistive elements.

Published unexamined Japanese Patent Application No. 59-138460 describes a thermal bubble jet printer having a partition wall near the heater surface shaped to make the flow of ink, during replenishment of ink after the emission of a drop, unbalanced in the vicinity of the heater so that the impact generated by the collapsing bubble is shifted to a position away from the heater surface to avoid damage to the heater.

No prior art is known in which a pillow-shaped bubble is formed with high pumping efficiency, and in which the bubbles collapse in an area enclosed by the heater structure so that erosion damage can be greatly reduced or even eliminated.

SUMMARY OF THE INVENTION

It is therefore the principal object of this invention to provide a thermal drop-on-demand ink jet print head which has a heater geometry in which cavitational damage is eliminated or greatly reduced.

In accordance with the invention, the objective is achieved by providing a thermal drop-on-demand ink jet print head having an array of heating means, each connected in an electrical circuit between a control electrode and a common electrode. Each of the heating means comprising a plurality of portions which enclose an elongated opening within the heating means. Upon energization of a selected one of the heating means, a bubble is formed at each of the plurality of portions, and all of the bubbles coalesce to form a single pillow-shaped bubble which causes a drop of ink to be ejected from the adjacent nozzle.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
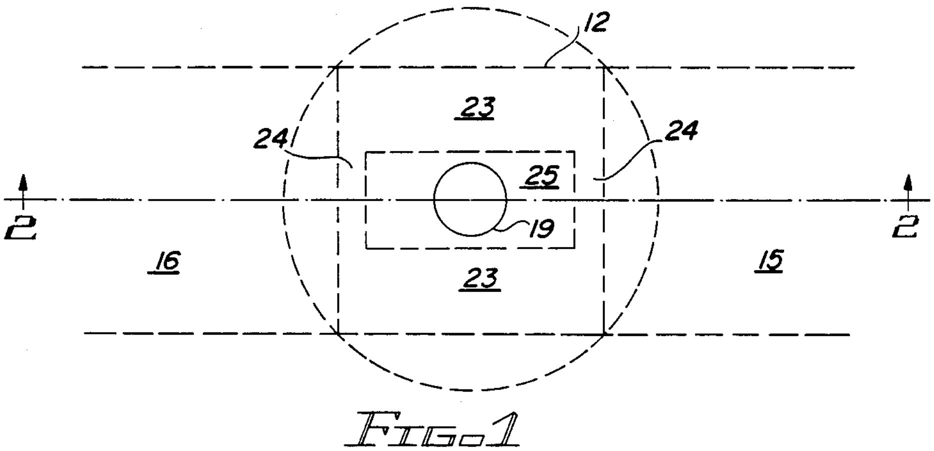
FIG. 1 is a plan view of a specific embodiment of a thermal drop-on-demand ink jet print head according to the present invention.
Figure 2:
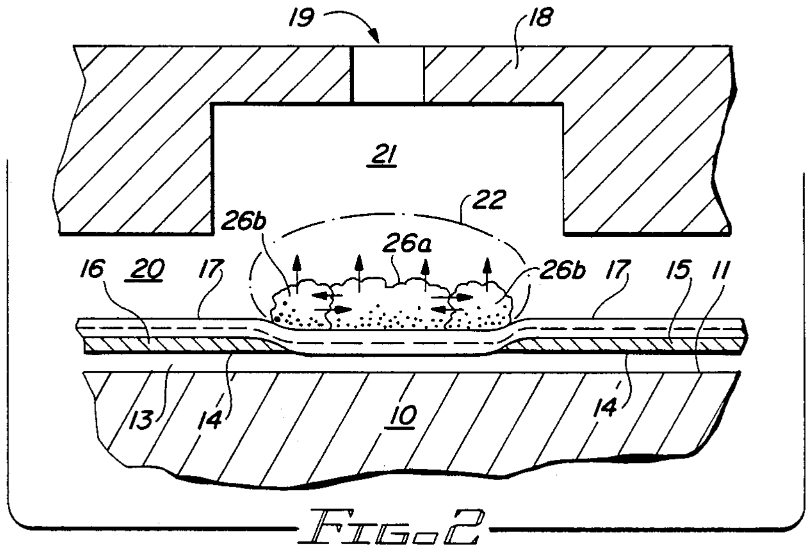
FIG. 2 is a section view taken along the lines 2—2 of FIG. 1.

Referring to FIGS. 1 and 2, the thermal drop-on-demand ink jet print head, according to the present invention, comprises a suitable substrate member 10, upon one surface 11 of which is formed an array of resistive heater elements 12, only one of which is shown in FIGS. 1 and 2 of the drawings. The resistive heater elements 12 comprise a multilayer thin film structure comprising a heat insulation layer 13 and resistive heater film 14. Layer 13 must also be electrically insulating. A common electrode 15, and an array of control electrodes 16 make electrical contact to each of the resistive heater films 14 except the area between the electrodes 15 and 16 which forms resistive heater elements 12. A passivation layer 17 is deposited over the array of the resistive heater elements 12 and the associated electrodes 15 and 16 to prevent both chemical and mechanical damage to the resistive heater elements 12 and the electrodes 15 and 16. Preferably passivation layer 17 comprises two layers of different materials in order to reduce the incidence of flaws of pinholes in the passivation layer.

A second substrate 18 is fixed in position adjacent to substrate 10 so that a nozzle 19 is opposite each of the resistive heating elements 12. Substrate 18 is shaped to provide an ink flow channel 20 to distribute a marking fluid such as ink to the print cavity 21 which holds a predetermined volume of ink between the resistive heater elements 12 and the corresponding nozzle 19.

In operation, a data pulse is supplied to control electrode 16 to energize the associated resistive heater element 12 to produce a bubble 22 in the ink adjacent heater element 12. The bubble grows so that the bubble motion forces a drop of ink from the associated nozzle 19.

According to the present invention, the geometry of resistive heater elements 12 is chosen so that the bubble is formed with high pumping efficiency but the bubble collapses at a place enclosed by the resistive heater elements so that cavitational damage to the heater is greatly reduced or even eliminated One of the key features of these geometries is that a small opening is provided in the middle of the heater geometry to allow bubble collapse away from the heat generating part.

Another feature of these geometries is a flexible shape and/or combination of heater elements to permit optimum use of bubble dynamics thereby resulting in higher pumping efficiency. To avoid current crowding problems in some designs, small metal pads or strips are used at designated places to force the electrical current path to follow the heater geometry and to shunt the potential spots of high current density. These metal pads/strips are masked and fabricated during the process steps in which the metal electrodes are produced.

The heater geometry may include more than one heater element, and elongated heater elements are used when possible to enhance nucleation uniformity. Elongated geometries have been shown to have better bubble nucleation characteristics due to the relatively compressed edge effects. Therefore, elongated heater geometries would have improved pumping efficiency since the bubble is more stable and the mechanical energy that it delivers is more focused due to the narrow energy spectrum.

In the embodiment of the invention shown in FIGS. 1 and 2, the resistive heater elements 12 comprise spaced elongated portions 23 joined by end portions 24 so that a small elongated opening 25 is formed in the middle of the resistive heater element where no resistive material is present.

In operation, bubbles will nucleate normally on both elongated portions 23 to form bubbles **26*a* and on both end portions 24 to form bubbles 26*b* (FIG. 2). Due to a slight variation in current density, bubble 26*b* will be formed with a slight delay from bubble 26*a*. These bubbles 26*a* and 26*b* continue to grow and coalesce or stick together at the perimeter and at the center during bubble growth. The bubbles 26*a*, 26*b* grow into a single pillow-shaped bubble 22 (see FIG. 2)so that the momentum is directed toward the nozzle 19 where a drop of ink is ejected in an energy-efficient manner. During the collapse phase, the bubble shrinks toward the center of the heater structure where no resistance material is present due to the existence of small elongated opening 25. Therefore, cavitational erosion does not damage the heat generating parts of the resistive heater elements 12**, and the reliability of the printing apparatus is improved.

During operation, the bubble nucleates at the heater element and grows in all directions on top of the heater.

The key design features for all the resistive heater elements of the present invention is to insure that the bubble growth toward the opening will coalesce. It has been shown that, in resistive heater elements of the type used here, the bubble growth extends for a specific distance outside the heater structure outline. This extended distance is normally a function of the bubble thickness which, in turn, is a function of the properties of the ink. Therefore, the heater can be designed to provide an opening that, based on the characteristics of the ink being used, will achieve bubble coalescence. This is important since, right after the drive pulse is turned off, the bubble collapses in a fashion dictated by its shape formed before collapse. The coalescence of the bubble over the opening forms a roughly pillow-shaped bubble which collapses symmetrically toward the center. Since there is no heater material at the center, the forces due to the collapse cannot damage the heater, so the reliability of the print head is improved.

Figure 3:
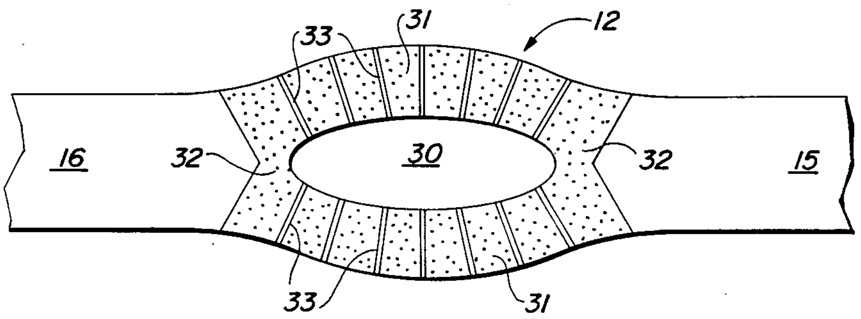
FIGS. 3-7 each show an alternate embodiment of the resistive heater element of the print head shown in FIGS. 1 and 2.

Another embodiment of resistive heater elements 12 is shown in FIG. 3 in which the elongated portions 31 are curved and are joined by end portions 32 to form a small elongated opening 30. Thin conductive strips 33 are formed at spaced intervals on elongated portions 31. The conductive strips 33 extend radially on curved elongated portions 31 to force the electrical current path to follow the curvature and avoid current crowding problems.

Figure 4:
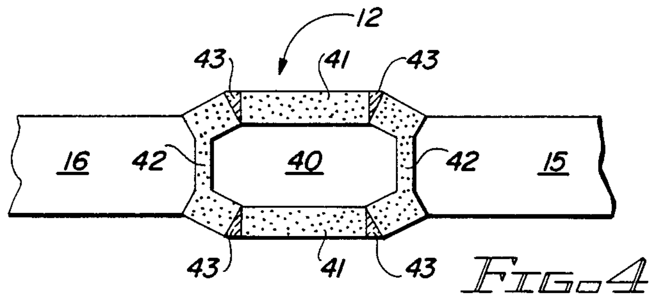

A further embodiment of resistive heater elements 12 is shown in FIG. 4 in which elongated portions 41 are joined by end portions 42 to form a small elongated opening 40. Elongated portions 41 comprise a plurality of straight sections joined at an angle. Conductive pads 43 are provided to contact the elongated portions 41 at the angled portions to force the electrical current to follow the straight sections and thereby avoid current crowding problems.

Figure 5:
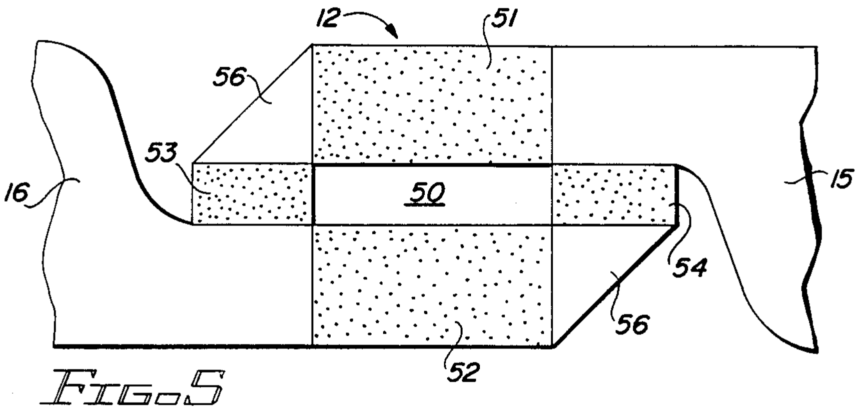

In the embodiment of the invention shown in FIG. 5 resistive heater element 12 comprises a plurality of heater elements arranged with spaced elongated elements 51 and 52, flanked on each end by end elements 53 and 54 to form a small opening 50 where no resistive material is deposited. Conductive pads 56 are provided at the two corners remote from electrodes 15 and 16 to maintain a uniform current path and to avoid current crowding at the inner corners.

It is a feature of the invention that the geometry of the embodiment shown in FIG. 5 can be modified slightly to control the time sequence of bubble nucleation among the active elements 51, 52, 53 and 54. This can be accomplished by changing either the material characterization or the dimension of each element to provide a bubble nucleation time sequence in the clockwise direction (or counterclockwise). The timing of the nucleation for the bubble for each element is a function of the power density applied to that element. For a given current, the power density is proportional to the resistivity of the heating material, and is inversely proportional to the width and thickness of each element. The higher the power density, the earlier the bubble nucleates. In this manner a rotational momentum can be imparted to the ink thereby ejecting a spinning drop which will have better directional stability. The time sequence of the bubble nucleation can also be designed to provide a better pressure cycle which reduces the problem of satellite drops and better matches the mechanical impedance of the nozzle/fluid system.

Figure 6:
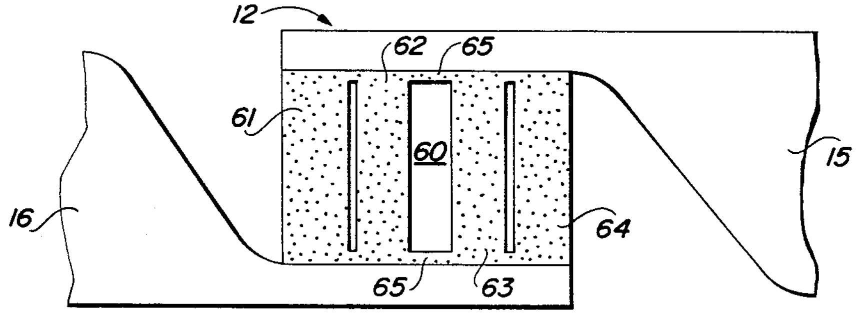

The embodiment of the invention shown in FIG. 6 shows resistive heater element which comprises end elements 65 and a plurality of elongated elements arranged with two adjacent elongated elements 61 and 62 separated from adjacent elongated elements 63 and 64 to form a small opening 60 in between the two sets of elements. Elongated elements 61, 62, 63 and 64 extend laterally between electrode 15 and 16. This arrangement has the advantages of the other embodiments so far as reduced cavitational damage is concerned, and also has the advantage that differences in bubble nucleation times between the elements can be utilized to obtain inertial enhancement of the resulting bubble to provide improved bubble jet performance.

Figure 7:
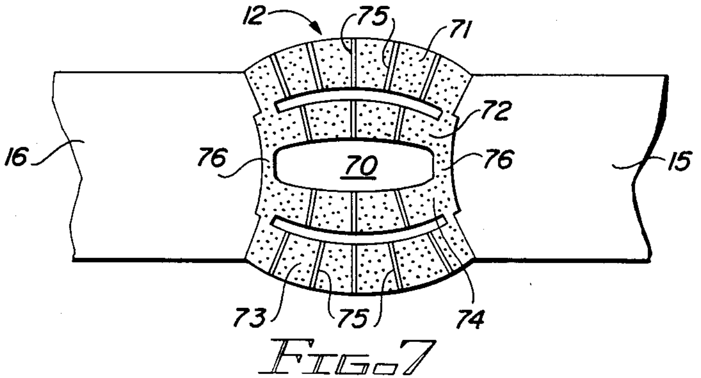

The embodiment shown in FIG. 7 is similar in concept with the exception that the elongated elements 71, 72, 73 and 74 extend along a curved path and thin conductive strips 75 are provided to avoid any current crowding problem. Opening 70 is provided by end elements 76 and elongated elements 71, 72, 73 and 74 and no resistive material is present in opening 70 so that cavitational damage can be minimized.

A number of embodiments of resistive heater elements have been described which not only reduce or eliminate cavitational damage but also increase the pumping efficiency of the print head in which these heater elements are used. The print head described is the type in which the nozzle is in a direction generally normal to the plane of the resistive heater element. However, it will be apparent that the disclosed heater structure can also be used in the print head of the type in which the nozzle is in a direction generally parallel to the plane of the resistive heater element.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A thermal drop-on-demand ink jet print heat comprising;

an electrically insulating substrate member;

an array of first electrical connection members formed on a first surface of said substrate member:

a common electrical connection member on said first surface of said substrate member;

an array of heating means on said first surface of said substrate member, said heating means being positioned on said substrate member so that each of said heating means are connected in an electrical circuit between one of said first electrical connection members and said common electrical connection member, each of said heating means comprising a plurality of elongated portions spaced by a predetermined distance which enclose an elongated opening within said heating means; and a nozzle plate fixedly mounted adjacent to said substrate member and having a nozzle therein disposed adjacent to each of said heating means whereby, upon connection of an electrical signal to a selected one of said first electrical connection members, a bubble is formed at each of said plurality of portions of said heating means, said predetermined distance being chosen so that all of said bubbles coalesce to form a single pillow-shaped bubble and a drop of ink is ejected from the adjacent nozzle.

2. The thermal drop-on-demand ink jet print head of claim 1 wherein each of said heating means comprises at least two spaced elongated portions the opposed edges of which form a major part of said elongated opening within said heating means and end portions which form the remainder of said elongated opening.

3. The thermal drop-on-demand ink jet print head of claim 2 wherein each of said spaced elongated portions extends in a non-linear path.

4. The thermal drop-on-demand ink jet print head of claim 3 wherein said spaced elongated portions have conductive strips across non-linear parts of said portions to prevent current crowding in said spaced elongated portions.

5. The thermal drop-on-demand ink jet print head of claim 3 wherein said spaced elongated portions extend in a curved path.

6. The thermal drop-on-demand ink jet print head of claim 5 wherein said spaced elongated portions have thin conductive strips which extend radially across said curved path.

7. The thermal drop-on-demand ink jet print head of claim 2 additionally comprising;

means for controlling the time sequence of bubble nucleation to said plurality of portions of said heating means whereby the momentum of said bubble can be directed in a predetermined direction.

8. The thermal drop-on-demand ink jet print head of claim 7 wherein said momentum of said bubble is a rotational momentum.

* * * * *